(12) United States Patent
Boyer

(10) Patent No.: US 11,511,783 B2
(45) Date of Patent: Nov. 29, 2022

(54) HAND TRUCK WITH TOE PLATE

(71) Applicant: DOREL HOME FURNISHINGS, INC., Columbus, IN (US)

(72) Inventor: Jason A. Boyer, Columbus, IN (US)

(73) Assignee: DOREL HOME FURNISHINGS, INC., Columbus, IN (US)

( * ) Notice: Subject to any disclaimer, the term of this patent is extended or adjusted under 35 U.S.C. 154(b) by 107 days.

(21) Appl. No.: 17/050,972

(22) PCT Filed: May 1, 2019

(86) PCT No.: PCT/US2019/030191
§ 371 (c)(1),
(2) Date: Oct. 27, 2020

(87) PCT Pub. No.: WO2019/213251
PCT Pub. Date: Nov. 7, 2019

(65) Prior Publication Data
US 2021/0229718 A1    Jul. 29, 2021

Related U.S. Application Data

(60) Provisional application No. 62/666,431, filed on May 3, 2018, provisional application No. 62/697,631, filed on Jul. 13, 2018.

(51) Int. Cl.
*B62B 1/12* (2006.01)

(52) U.S. Cl.
CPC ............ *B62B 1/12* (2013.01); *B62B 2205/20* (2013.01); *B62B 2205/33* (2013.01)

(58) Field of Classification Search
CPC .... B62B 1/12; B62B 2205/20; B62B 2205/33
See application file for complete search history.

(56) References Cited

U.S. PATENT DOCUMENTS

| 1,484,864 | A | * | 2/1924 | Bompart | ................... | B62B 1/14 |
| | | | | | | 280/47.2 |
| 2,680,027 | A | * | 6/1954 | De Puydt | .................. | B62B 1/14 |
| | | | | | | 280/47.28 |
| 3,647,238 | A | | 3/1972 | Mackey | | |
| 6,227,789 | B1 | * | 5/2001 | Williamson | ............ | B62B 1/145 |
| | | | | | | 414/490 |
| 2003/0201618 | A1 | | 10/2003 | Seagraves et al. | | |

OTHER PUBLICATIONS

PCT International Search Report and Written Opinion completed by the ISA/US on Jun. 25, 2019 and issued in connection with PCT/US2019/030191.

* cited by examiner

*Primary Examiner* — Bryan A Evans
(74) *Attorney, Agent, or Firm* — Barnes & Thornburg LLP

(57) ABSTRACT

A hand truck includes a base that is able to roll along the ground underlying the base and a push handle coupled to the base. A pivotable toe plate is coupled to a lower end of the base.

20 Claims, 6 Drawing Sheets

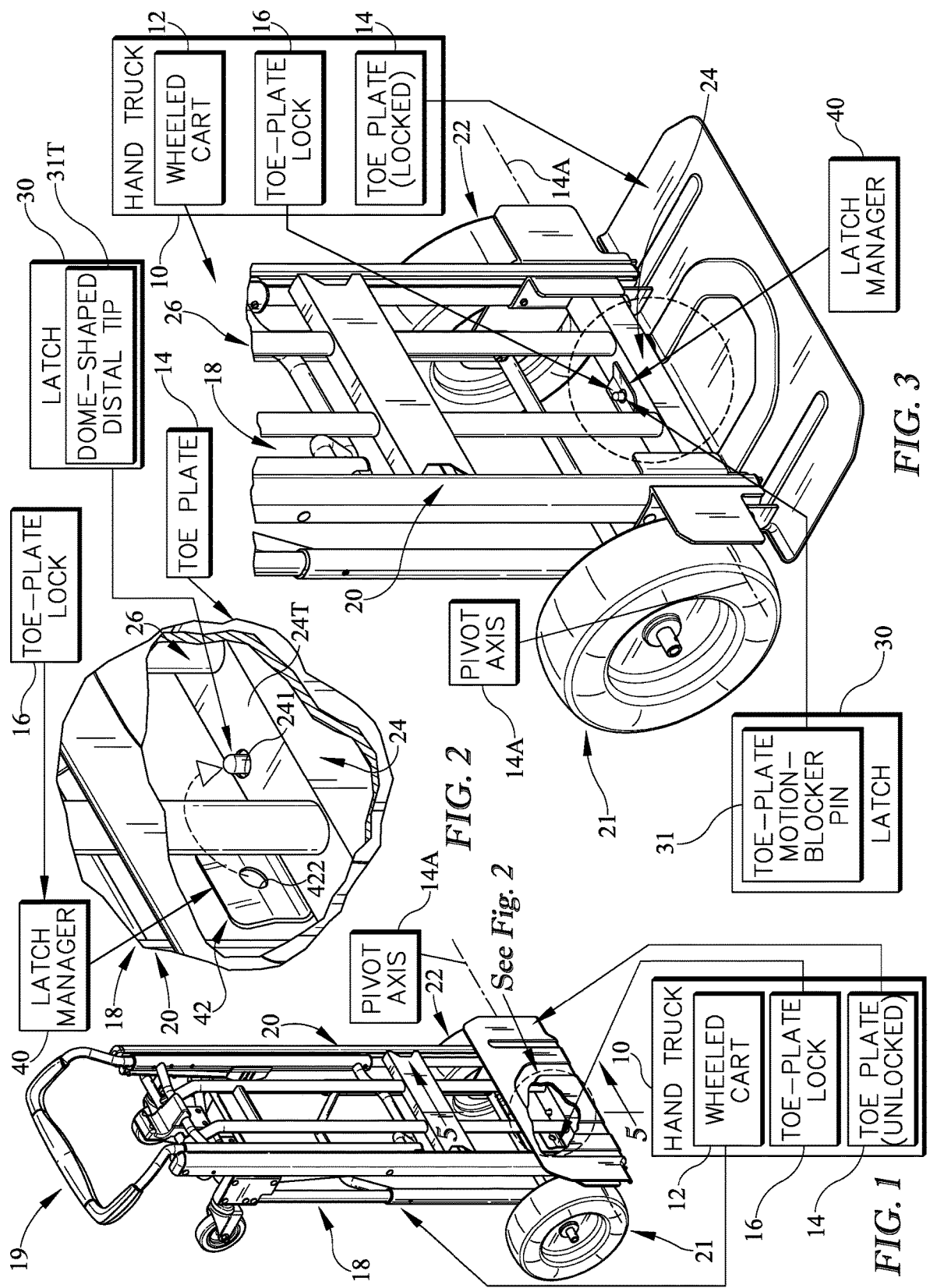

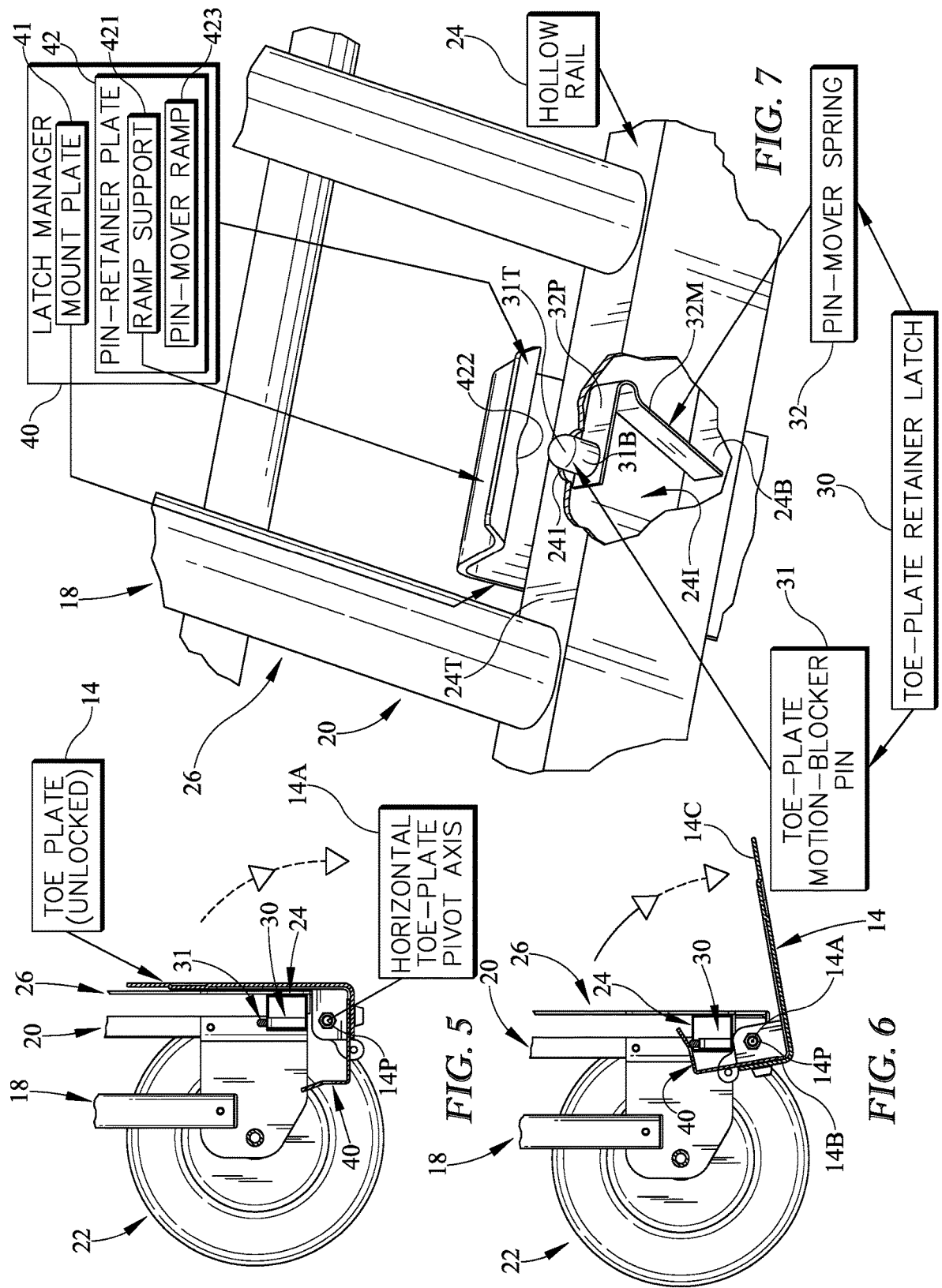

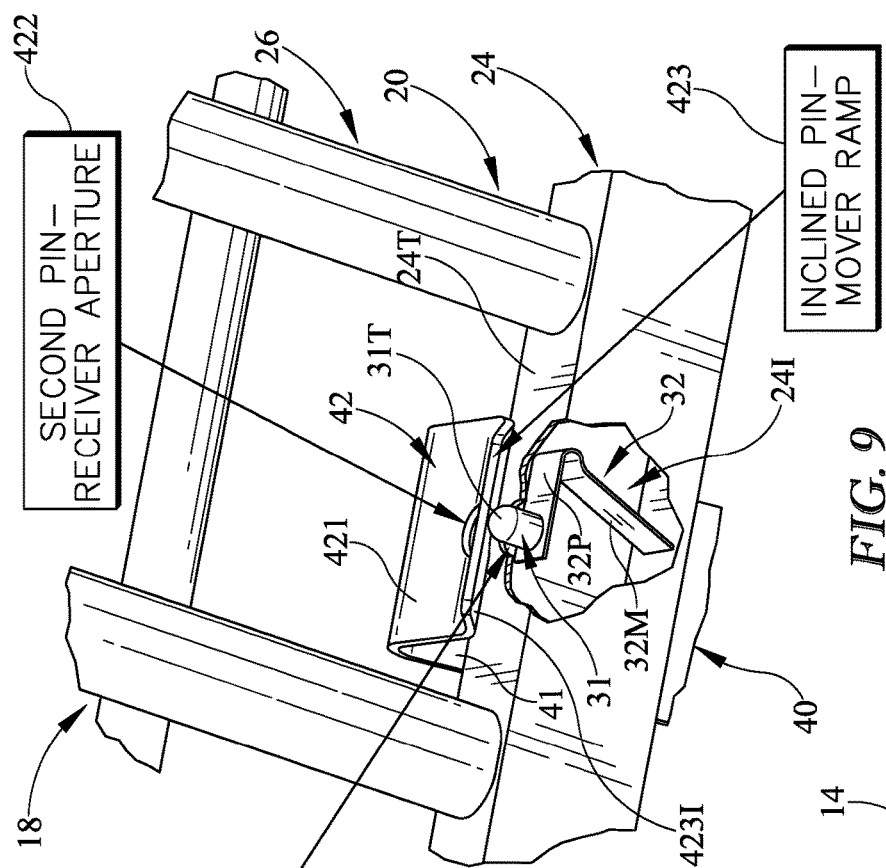
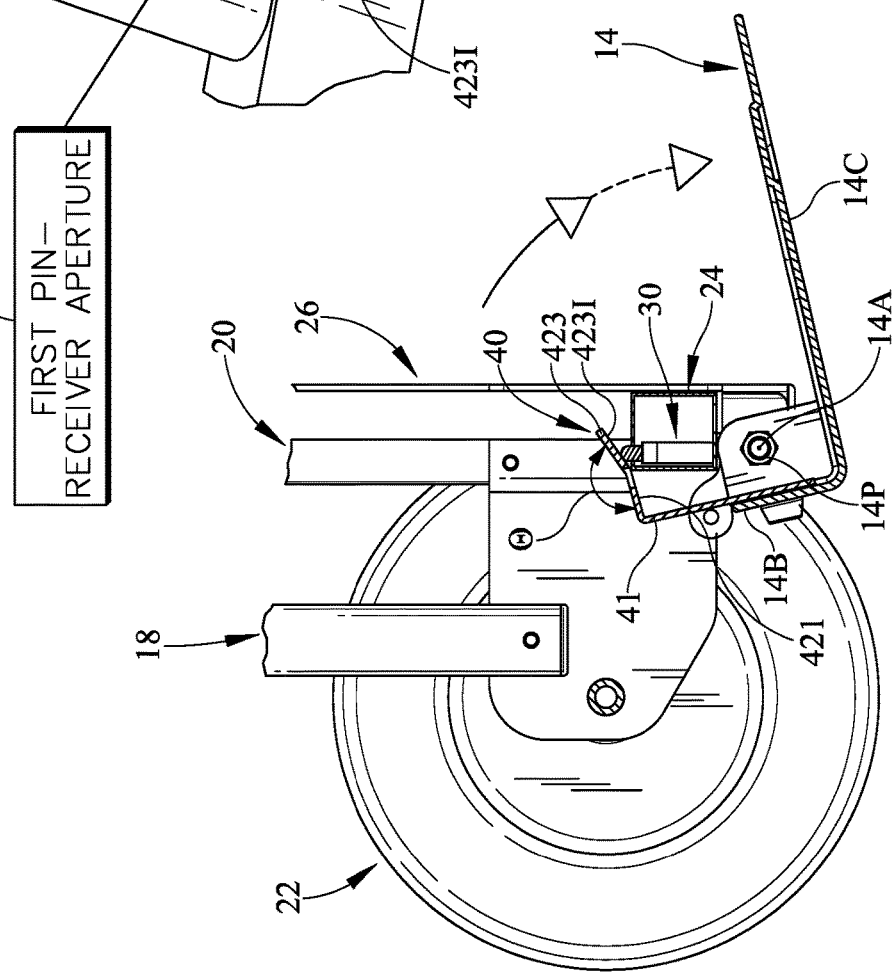

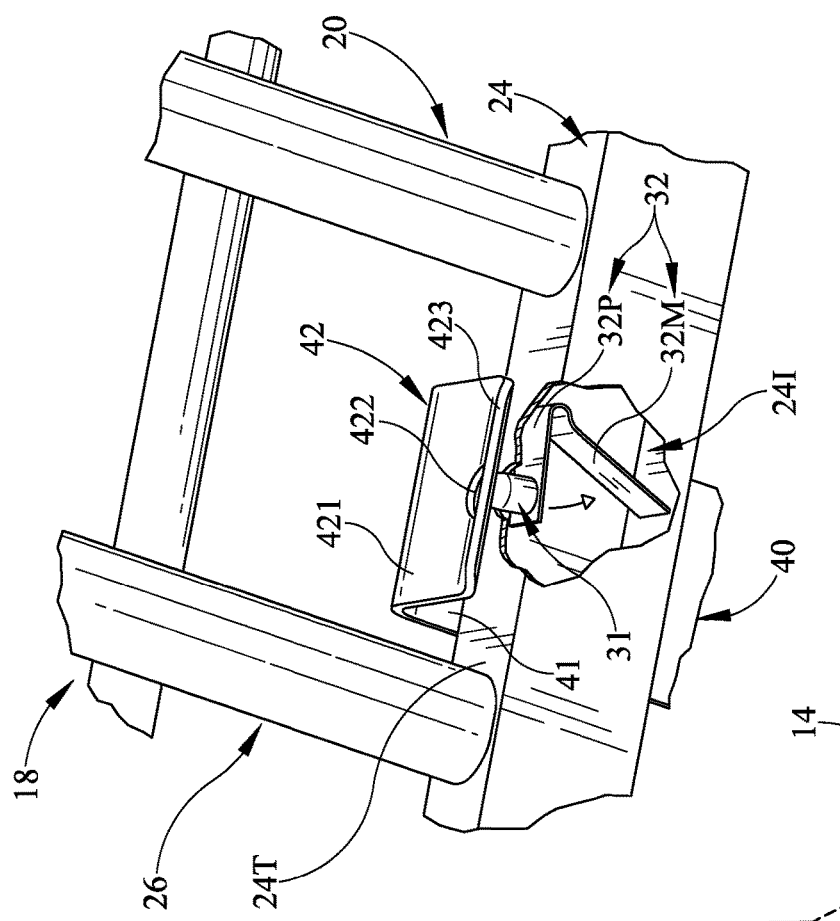
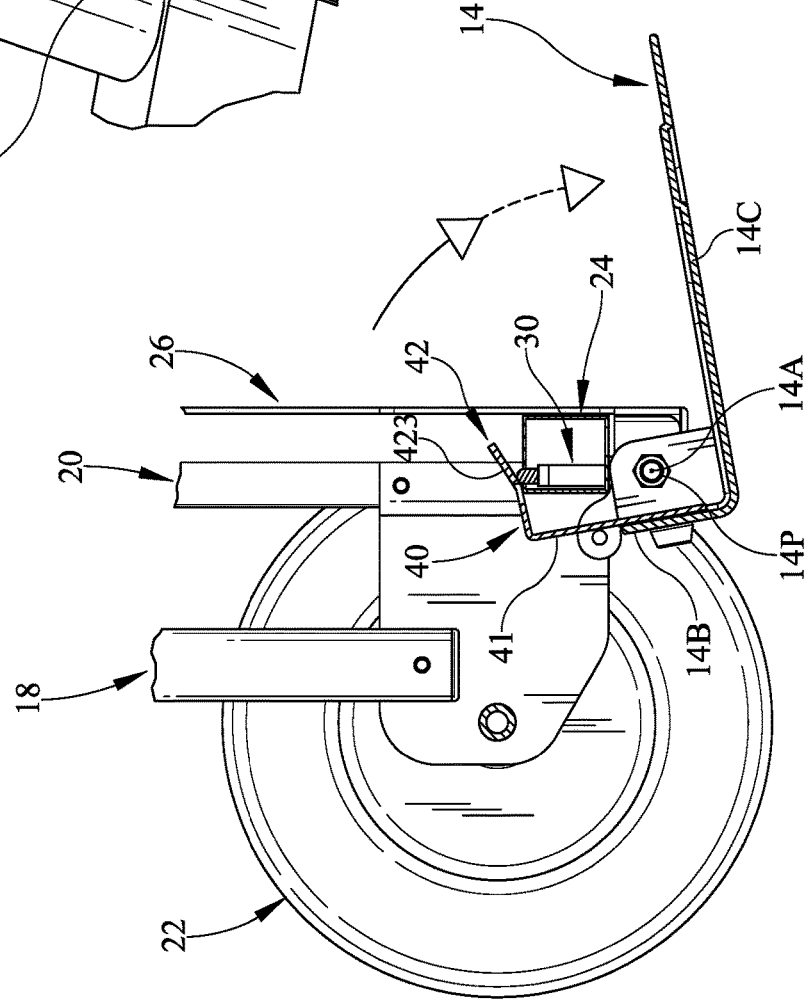
FIG. 11
FIG. 10

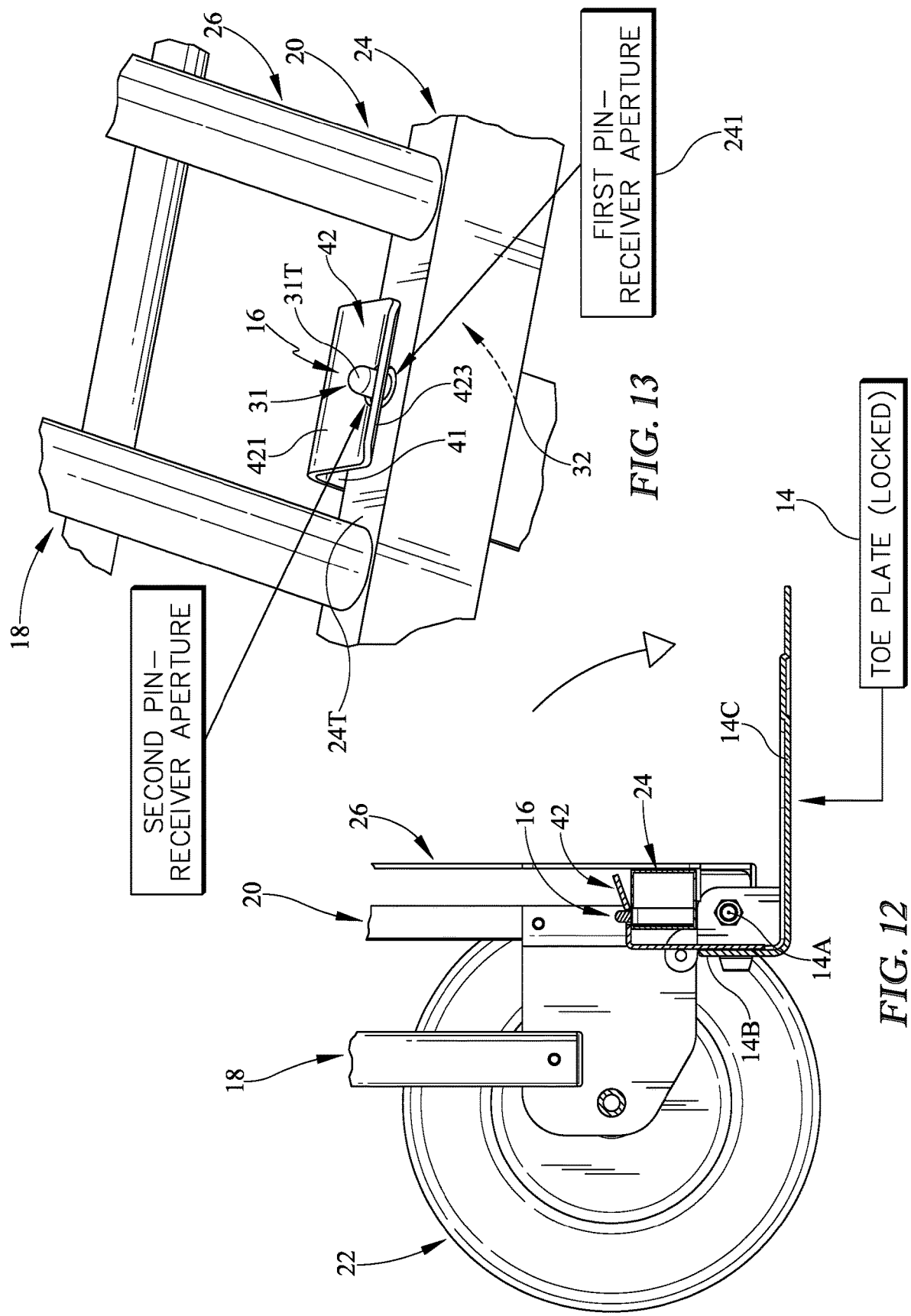

US 11,511,783 B2

HAND TRUCK WITH TOE PLATE

CROSS-REFERENCE TO RELATED APPLICATIONS

This application is a U.S. national stage entry of PCT Application No. PCT/US2019/030191, filed May 1, 2019, which claims priority under 35 U.S.C. § 119(e) to U.S. Provisional Application No. 62/666,431, filed May 3, 2018 and to U.S. Provisional Application No. 62/697,631, filed Jul. 13, 2018, which are expressly incorporated by reference herein.

BACKGROUND

The present disclosure relates to a hand truck and particularly to a hand truck with a toe plate. More particularly, the present disclosure relates to a pivotable toe plate for a hand truck.

SUMMARY

According to the present disclosure, a hand truck includes a wheeled cart including a rolling base having a frame and two base wheels coupled to the frame and a base pusher coupled to the rolling base. In illustrative embodiments, the hand truck further includes a toe plate mounted on a lower end of the frame of the rolling base near the two base wheels for pivotable movement about a horizontal toe-plate pivot axis from an upright storage position arranged to extend along the frame of the rolling base in a direction toward the base pusher to a projected use position arranged to extend outwardly at about a right angle to the frame.

In illustrative embodiments, the hand truck further includes releasable toe-plate lock means for temporarily retaining the toe plate in the projected use position when the toe plate arrives at the projected use position following pivotable movement of the toe plate about the horizontal toe-plate pivot axis away from the upright storage position and toward the projected use position. The releasable toe-plate lock means includes a toe-plate retainer latch coupled to the frame of the rolling base and a latch manager coupled to the toe plate to pivot with the toe plate as the toe plate is pivoted about the horizontal toe-plate pivot axis between the upright storage position and the projected use position. The latch manager is configured to mate automatically with the toe-plate retainer latch upon arrival of the pivoting toe plate at the projected use position following pivoting movement of the toe plate from the upright storage position.

In illustrative embodiments, the toe-plate retainer latch includes an upright toe-plate motion-blocker pin and a pin-mover spring coupled to the toe-plate motion-blocker pin. The frame of the rolling base comprises a hollow rail that includes a top plate formed to include a first pin-receiver aperture that is sized to receive the upright toe-plate motion-blocker pin therein. The latch manager is formed to include a second pin-receiver aperture that is aligned with the first pin-receiver aperture formed in the top plate of the hollow rail when the toe plate arrives at the projected use position. The pin-mover spring urges the upright toe-plate motion-blocker pin upwardly to extend through the first and second pin-receiver apertures to block movement of the latch manager relative to the toe-plate retainer latch that is coupled to the hollow rail of the frame of the rolling base so that the toe plate that is coupled to the latch manager is retained in the projected use position.

In illustrative embodiments, the hollow rail of the frame is formed to include an interior region under the top plate and above a bottom plate included in the hollow rail. The pin-mover spring is arranged to lie in the interior region and yieldably urge the upright toe-plate motion-blocker pin in an upward direction through the first pin-receiver aperture formed in the top plate. This causes a dome-shaped distal tip of the toe-plate motion-blocker pin to be exposed above the top plate of the top rail so that it can be engaged and moved downwardly by the latch manager of the releasable toe-plate lock during pivoting movement of the toe-plate toward the projected use position. Once the toe plate reaches the projected use position, the pin-mover spring lifts the toe-plate motion-blocker pin upwardly in the first pin-receiver aperture to extend into the second pin-receiver aperture formed in the latch manager that is coupled to the pivotable toe plate.

In illustrative embodiments, the latch manager includes a mount plate coupled to the toe plate to pivot therewith and a pin-receiver plate formed to include the second pin-receiver aperture and coupled to a free end of the mount plate to extend away from the mount plate and the toe plate. The pin-receiver plate includes a ramp support cantilevered to a free end of the mount plate and an inclined pin-mover ramp cantilevered to a free end of the ramp support.

In illustrative embodiments, the inclined pin-mover ramp is configured to provide means for engaging the exposed dome-shaped distal tip of the toe-plate motion-blocker pin (that has been projected through the first pin-receiver aperture formed in the top plate of the hollow rail by the pin-mover spring) during pivoting movement of the toe plate about the horizontal toe-plate pivot axis from the upright storage position to the projected use position to cause the toe-plate motion-blocker pin to move downwardly relative to the top plate of the hollow rail of the frame and compress the pin-mover spring so that the dome-shaped distal tip of the toe-plate motion-blocker pin rides along pin-guiding surfaces of the ramp support and the inclined pin-mover ramp of the pin-receiver plate until the dome-shaped distal tip of the motion-blocker pin is aligned with the second pin-receiver aperture. Once the first and second pin-receiver apertures are aligned, the pin-mover spring in the compressed state is allowed to expand and move the toe-plate motion-blocker pin upwardly into the second pin-receiver aperture formed in the pin-receiver plate of the latch manager when the toe plate arrives at the projected use position and thereafter block pivoting movement of the toe plate relative to the frame of the rolling base.

Additional features of the present disclosure will become apparent to those skilled in the art upon consideration of the following detailed description exemplifying the best mode of carrying out the disclosure as presently perceived.

BRIEF DESCRIPTION OF THE DRAWINGS

The detailed description particularly refers to the accompanying figures in which:

FIG. 1 is a perspective view of a hand truck in accordance with the present disclosure and showing a pivotable toe plate in an unlocked upright storage position to extend along a frame of a rolling base included in a wheeled cart of the hand truck and suggesting that a toe-plate lock is also included in the hand truck and arranged to interact with the frame and the toe plate at a proper time to retain the toe plate temporarily in the projected use position as suggested in FIG. 3;

FIG. 2 is an enlarged perspective view taken from the circled region of FIG. 1 showing that a latch manager of the toe-plate lock has not yet mated with an exposed dome-shaped distal tip of a toe-plate motion-blocker pin of a toe-plate retainer latch of the toe-plate lock to lock the toe plate to the frame as suggested in FIG. 3 and also showing that the toe-plate motion-blocker pin is urged upwardly to extend through a first pin-receiver aperture formed in a top plate of a hollow rail included in the frame of the rolling abase so that the dome-shaped distal tip of the toe-plate motion-blocker pin is visible above the top plate of the hollow rail;

FIG. 3 is a perspective view of a lower portion of the hand truck of FIG. 1 after the toe plate has been pivoted forwardly about a horizontal toe-plate pivot axis relative to the frame of the rolling base to arrive at a projected use position and showing that a toe-plate motion-blocker pin of a toe-plate retainer latch included in the toe-plate lock and linked to the frame of the rolling base is urged upwardly to extend through a second pin-receiver aperture formed in a latch manager that is mounted on the toe plate to pivot with the toe plate about the horizontal toe-plate pivot axis while the toe-plate motion-blocker pin continues to extend upwardly through the first pin-receiver aperture formed in the top plate of the hollow rail to retain the toe plate as suggested in FIG. 3 in the projected use position as long as the toe plate remains in the projected use position relative to the frame of the rolling base;

FIG. 5 is an enlarged sectional view taken along lines 5-5 of FIG. 1 showing the toe plate in the unlocked upright storage position relative to the frame of the rolling base and showing that the latch manager is coupled to the pivotable toe plate and arranged to extend rearwardly away from the horizontal toe-plate pivot axis;

FIG. 6 is a sectional view similar to FIG. 5 showing that the toe plate has been pivoted by a user in a forward direction away from the frame of the rolling base to move toward the projected use position shown in FIG. 3;

FIG. 7 is a perspective view of the toe plate of FIG. 6 showing that a dome-shape distal tip of the toe-plate motion-blocker pin of the toe-plate retainer latch is urged by an underlying pin-mover spring of the toe-plate retainer latch to project upwardly through a first pin-receiver aperture formed in a top plate of a hollow rail included in the frame of the rolling base and showing that an inclined pin-mover ramp provided at a free end of a pin-retainer plate of the latch manager that is coupled to the pivotable toe plate has begun to move toward the exposed dome-shaped distal tip of the toe-plate motion-blocker pin of the toe-plate retainer latch in response to pivoting movement of the pivotable toe plate away from the frame of the rolling base and toward the projected use position as shown in FIG. 6;

FIG. 8 is a sectional view similar to FIG. 6 showing that the pivotable toe plate has been pivoted further about the horizontal toe-plate pivot axis toward the projected use position;

FIG. 9 is a perspective view of the toe plate of FIG. 8 showing that the pivotable toe plate has been pivoted far enough about the horizontal toe-plate pivot axis to cause the inclined pin-mover ramp of the latch manager to engage the exposed dome-shaped tip of the toe-plate motion-blocker pin of the toe-plate retainer latch and to reveal the second pin-receiver aperture formed in the latch manger;

FIG. 10 is a sectional view similar to FIG. 9 showing the pivotable toe plate and the latch manager coupled to the toe plate just before the pivotable toe plate arrives at the projected use position;

FIG. 11 is a perspective view of the toe plate of FIG. 10 showing that the pivoting inclined pin-mover ramp has begun to push the toe-plate motion-blocker pin downwardly relative to the top plate of the hollow rail to compress the underlying pin-mover spring so that the dome-shaped distal tip of the motion-blocker spring moves on the underside of the latch manager as shown in FIG. 10 until that tip is aligned with a second pin-receiver aperture formed in the latch manager as shown, for example, in FIGS. 12 and 13;

FIG. 12 is a sectional view similar to FIG. 11 showing that the pivotable toe plate has arrived at the projected use position; and FIG. 13 is a perspective view of the toe plate of FIG. 13 showing that the toe-plate motion-blocker pin has been urged by the underlying pin-mover spring to extend, in sequence, through the first pin-receiver aperture formed in the top plate of the hollow rail of the frame of the rolling base and then through the second pin-receiver aperture formed in the latch manager to block pivoting motion of the pivotable toe plate about the horizontal toe-plate pivot axis relative to the frame of the rolling base as shown in FIG. 12 so that the pivotable toe plate is retained temporarily in the projected use position.

DETAILED DESCRIPTION

Figure 4:
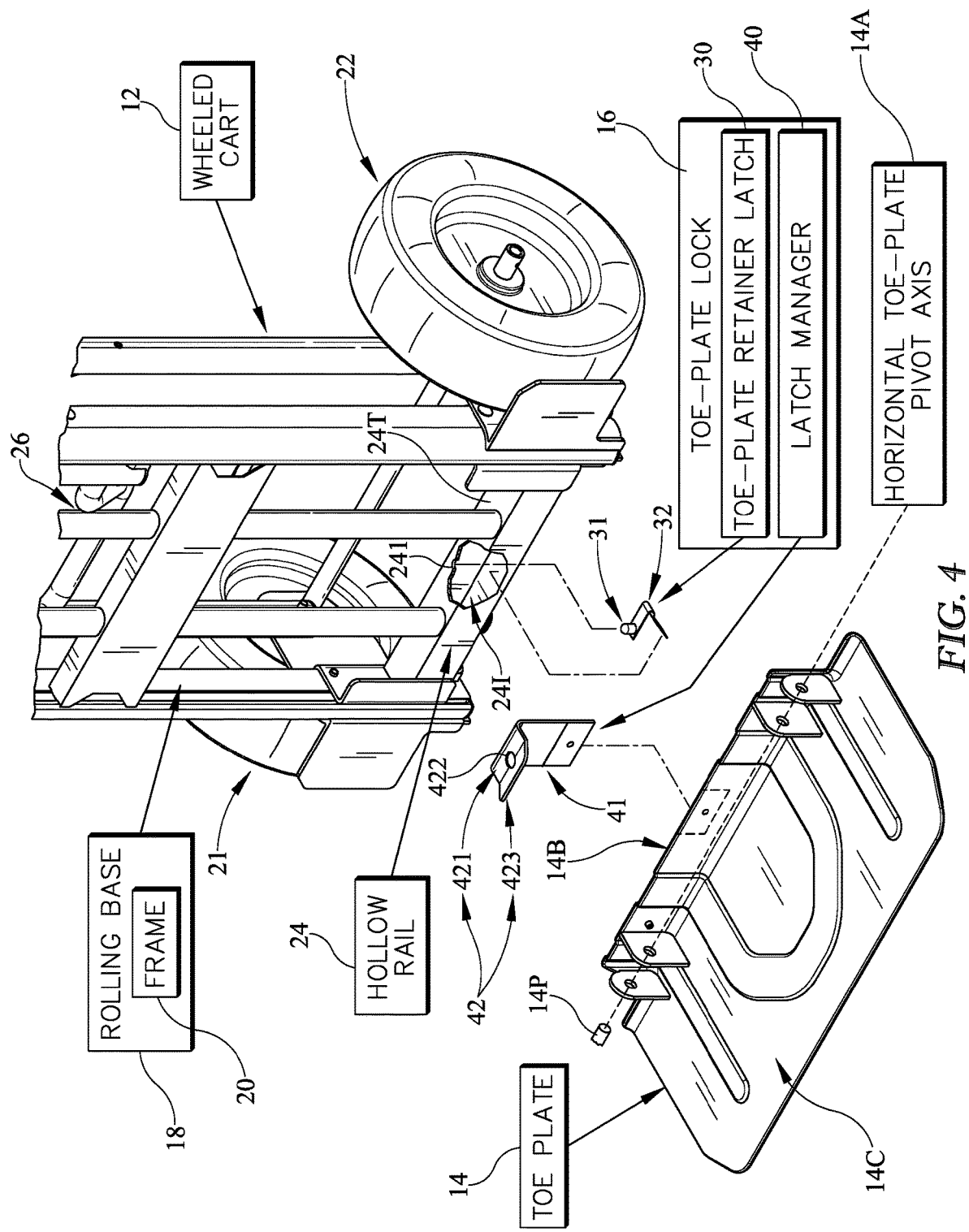
FIG. 4 is an exploded perspective assembly view of several of the components included in the hand truck of FIG. 1 suggesting that the toe-plate lock includes a toe-plate retainer latch that is mounted in an interior region provided in a hollow rail of a frame in a rolling base of the wheeled cart and a latch manager that is coupled to the toe plate to pivot therewith about the horizontal toe-plate pivot axis.

A hand truck 10 in accordance with the present disclosure includes a wheeled cart 12 and a pivotable toe plate 14 mounted to pivot about a horizontal toe-plate pivot axis 14A between an upright storage position shown in FIG. 1 and a projected use position shown in FIG. 3 following a pivoting sequence illustrated in FIGS. 5-13. A toe-plate lock 16 is also included in wheeled cart 12 and configured to lock the pivotable toe-plate 14 in the projected use position as soon as the pivoting toe plate 14 arrives in the projected use position as shown, for example, in FIGS. 3, 12, and 13.

Wheeled cart 12 includes a rolling base 18 and a base pusher 19 coupled to rolling base 18 as shown in FIG. 1. Rolling base 18 includes a frame 20 and two wheels 21, 22 coupled to frame 20. Toe plate 14 is mounted on a lower end of frame 20 for pivotable movement about the horizontal toe-plate pivot axis 14A between an upright storage position arranged to extend along frame 20 in a direction toward base pusher 19 as shown in FIG. 1 to a projected use position arranged to extend outwardly at about a right angle to frame 20 as shown in FIG. 3. Reference is made to U.S. Pat. Nos. 8,100,430 and 8,465,046 for disclosure of a hand truck, which disclosures are hereby incorporated herein in their entirety.

Toe plate 14 can pivot about pivot axis 14 so that it can lie flat against frame 20 in rolling base 18 in the upright storage position for better storage and shipping or when moving items that are large enough such that it is an advantage that toe plate 14 is folded flat on frame 14. Toe-plate lock 16 is configured to lock the folding toe plate 14 in the projected use position to minimize the chance that hand truck 10 will tip over when in use or displayed in a store.

Toe plate 14 is rotatably attached with bolts to frame 20 and a generally L-shaped latch manger 40 is attached to a rear wall 14B of the plate 14 as suggested in FIGS. 4 and 6.

A hole 422 is formed in latch manager 40 in a plate 42 that is generally parallel to carrier 14C of the plate 14. This hole 422 aligns with a spring-loaded toe-plate motion-blocker pin 31 included in a toe-plate retainer latch 30 coupled to frame 20 of rolling base 18 as suggested in FIGS. 12 and 13 when toe plate 14 is pivoted to the projected use position. The spring-loaded pin 31 extends upwardly into the hole 422 formed in latch manger 40 to retain toe plate 14 in a locked and stationary positon in the projected use position. To unlock toe plate 14, a user pushes downwardly on the exposed end of the spring-loaded pin 31 to disengage pin 31 from latch manager 40 to free toe plate 14 to be pivoted about pivot axis 14A from the projected use positon show in FIG. 3 to the upright storage position shown in FIG. 1. To re-engage the lock, toe plate 14 is rotated 90 degrees in the opposite direction about pivot axis 14A and a ramp 423 in latch manager 40 will push downwardly on the spring-loaded pin 31 as shown in FIGS. 10 and 11 and that pin 31 will extend upwardly through the hole 422 in latch manger 40 automatically when the toe plate 14 arrives at the projected use position as shown in FIGS. 12 and 13.

Toe-plate lock 16 is configured to provide means for temporarily retaining toe plate 14 in the projected use position as shown in FIG. 3 when toe plate 14 arrives at the projected use position following pivotable movement of toe plate 14 about the horizontal toe-plate pivot axis 14A away from the upright storage position shown in FIGS. 1 and 5 and toward the projected use position as shown in a sequence illustrated in FIGS. 5-13. Toe-plate lock 14 includes a toe-plate retainer latch 30 coupled to frame 20 of rolling base 18 of wheeled cart and a latch manager 40 coupled to toe plate 14 to pivot with toe plate 14 about the horizontal toe-plate pivot axis 14A between the upright storage position and the projected use position. Latch manager 40 mates with toe-plate retainer latch 30 to block further pivotable movement of toe plate 14 about the horizontal toe-plate pivot axis 14A when toe plate 14 arrives at the projected use position as suggested in FIGS. 2, 3, 12, and 13.

Toe-plate retainer latch 30 includes an upright toe-plate motion-blocker pin 31 and a pin-mover spring 32 coupled to toe-plate motion-blocker pin 31 as shown, for example, in FIGS. 4 and 7. Pin 31 includes a base 31B and a dome-shaped distal tip 31T provided at a free end of base 31B as suggested in FIGS. 2 and 7. Pin-mover spring 32 includes a horizontally extending pin platform 32P and an angled platform mover 32M and is a monolithic component made of a suitable spring material in an illustrative embodiment shown in FIG. 7. An upper end of angled platform mover 32M is coupled to one end of pin platform 32P as shown in FIG. 7. A lower end of angled platform mover 32M is engaged to a bottom plate 24B of hollow rail 24 as shown in FIG. 7. Base 31B of toe-plate motion-blocker pin 31 is coupled to an upwardly facing surface of pin platform 32P to orient dome-shaped distal tip 31T of toe-plate motion-blocker pin 31 to face upwardly as shown in FIG. 7.

Frame 20 of rolling base 18 of wheeled cart 12 includes a horizontally extending hollow rail 24 that is located between wheels 21, 22 and near ground underlying and supporting wheels 21, 22 as well as other framework 26 coupled to hollow rail 24 and extending upwardly from hollow rail 24 as shown, for example, in FIG. 4. Hollow rail 24 is formed to include an interior region 241 for housing pin-mover spring 32 as shown in FIG. 7. Hollow rail 24 includes a top plate 24T that is formed to include a first pin-receiver aperture 241 as suggested in FIGS. 2, 7, and 13. Hollow rail 24 also includes a bottom plate 24B that lies under top plate 24T to locate interior region 241 therebetween. When pin-mover spring 32 is placed in interior region 241 of hollow rail 24 so that pin platform 32P lies along the underside of top plate 24T and the lower end of angled platform mover 32M engages an upwardly facing surface surface of bottom plate 24B, the upright toe-plate motion-blocker pin 31 that is coupled to pin platform 32P of pin-mover spring 32 is arranged to extend upwardly through the first pin-receiver aperture 241 formed in top plate 24T to expose dome-shaped distal tip 31T of pin 31 above top plate 24T as shown, for example, in FIGS. 2, 3, and 7.

Toe plate 14 includes a carrier 14C and a bracket 14B coupled to a rear edge of carrier 14C and arranged to extend upwardly away from carrier 14C as shown, for example, in FIG. 4. Toe plate 14 also includes a horizontally extending pivot axle 14P that is coupled to bracket 14B and to frame 20 of rolling base 18 of wheeled cart 12 to support toe plate 14 for pivotable movement about horizontal toe-plate pivot axis 14A as suggested in FIG. 4 and in FIGS. 5, 6, 8, 10, and 12.

Latch manager 40 includes a mount plate 41 adapted to be coupled to bracket 14B of toe plate 14 and a pin-receiver plate 42 coupled to a free end of mount plate 41 as shown, for example, in FIG. 4. Pin-receiver plate 42 is formed to include a second pin-receiver aperture 422 as shown in FIGS. 2 and 4.

Pin-receiver plate 42 includes a ramp support 421 cantilevered to a free end of mount plate 41 and an inclined pin-mover ramp 423 cantilevered to a free end of ramp support 421 as shown in FIG. 4. Portions of each of ramp support 421 and inclined pin-mover ramp 423 cooperate to form the second pin-receiver aperture 422. Upwardly facing outer surfaces of ramp support 421 and inclined pin-mover ramp 423 cooperate to define an obtuse dihedral angle θ therebetween as suggested in FIGS. 4 and 8. An inner surface 423I of the inclined pin-mover ramp 423 of latch manager 40 will engage the dome-shaped distal tip 31T of toe-plate motion-blocker pin 31 of toe-plate retainer latch 30 during pivotable movement of toe plate 14 about the horizontal toe-plate pivot axis 14A as suggested in FIGS. 8 and 9 as toe plate 14 pivots from the upright storage position to the projected use position as shown, for example, in FIGS. 5-13.

The inclined pin-mover ramp 423 of latch manager 40 is configured to provide means for engaging the exposed dome-shaped distal tip 31T of toe-plate motion-blocker pin 31 (that has been projected through first pin-receiver aperture 241 formed in top plate 24T of hollow rail 24 by pin-mover spring 32) during pivoting movement of toe plate 14 about the horizontal toe-plate pivot axis 14A from the upright storage position to the projected use position. Such engagement causes the toe-plate motion-blocker pin 31 to move downwardly relative to top plate 24T of hollow rail 24 of frame 20 and compress pin-mover spring 32 so that dome-shaped distal tip 31T of motion-blocker pin 31 rides along pin-guiding surfaces of ramp support 421 and the inclined pin-mover ramp 423 of pin-receiver plate 42 until dome-shaped distal tip 31T of the motion-blocker pin 31 is aligned with second pin-receiver aperture 422 formed in latch manager 40 to allow pin-mover spring 32 in the compressed state to expand and move toe-plate motion-blocker pin 31 into the second pin-receiver aperture 422 formed in pin-receiver plate 42 of latch manager 40 when toe plate 14 arrives at the projected use position and thereafter block pivoting movement of toe plate 14 relative to frame 20 of rolling base 18.

A hand truck 10 in accordance with the present disclosure includes a pivotable toe-plate 14 shown in FIG. 1 in an unlocked upright storage position and arranged to extend along a frame 20 of a rolling base 18 included in a wheeled cart 12 of hand truck 10. A toe-plate lock 16 is also included in hand truck 10 and arranged to interact with frame 20 and toe plate 14 at a proper time to retain toe plate 14 temporarily in the projected use position as suggested in FIGS. 3 and 4. A latch manager 40 of toe-plate lock 16 has not yet mated with an exposed dome-shaped distal tip 31T of a toe-plate motion blocker pin 31 of a toe-plate retainer latch 30 of toe-plate lock 16 to lock toe plate 14 to frame 20 when toe plate 14 is in the unlocked upright storage position as suggested in FIG. 2.

An exploded perspective assembly view of several of the components included in hand truck 10 is provided in FIG. 4 to suggest that toe-plate lock 16 includes a toe-plate retainer latch 30 that is mounted in an interior region 24I provided in a hollow rail 24 of frame 20 in a rolling base 18 of wheeled cart 12. Toe-plate lock 16 and also includes a latch manager 40 that is coupled to toe plate 14 as suggested in FIGS. 4-6.

Toe plate 14 is located in the unlocked upright storage position relative to frame 20 of rolling base 18 as shown in FIG. 5. Latch manager 40 is coupled to the pivotable toe plate 14 and arranged to extend rearwardly away from the horizontal toe-plate pivot axis 14A as shown in FIG. 5.

A perspective view of a lower portion of hand truck 10 after toe plate 14 has been pivoted forwardly about a horizontal toe-plate pivot axis 14A relative to frame 20 of rolling base 18 to arrive at a projected use position is shown in FIG. 3. A toe-plate motion-blocker pin 31 of the toe-plate retainer latch 30 included in toe-plate lock 16 and linked to frame 20 of rolling base 18 is urged upwardly to extend through a pin-receiver aperture 422 formed in the latch manager 40 that is mounted on toe plate 14 to pivot with toe plate 14 about the horizontal toe-plate pivot axis 14 to retain toe plate 14 as suggested in FIG. 4 in the projected use position as long as toe plate 14 remains in the projected use position relative to frame 20 of rolling base 18.

Toe plate 14 has been pivoted by a user in a forward direction away from frame 20 of rolling base 18 as suggested in FIG. 6 to move to the projected use position shown in FIGS. 3, 12, and 13. Dome-shape distal tip 3T of toe-plate motion-blocker pin 31 of toe-plate retainer latch 30 is urged by an underlying pin-mover spring 32 of toe-plate retainer latch 30 to project upwardly through a first pin-receiver aperture 241 formed in top plate 24T of hollow rail 24 included in frame 20 of rolling base 18. An inclined pin-mover ramp 423 provided at a free end of a pin-retainer plate 142 of the latch manager 40 that is coupled to the pivotable toe plate 14 has begun to move toward the exposed dome-shaped distal tip 31T of toe-plate motion-blocker pin 31 of toe-plate retainer latch 30 in response to pivoting movement of the pivotable toe plate 14 away from frame 14 of rolling base 18 and toward the projected use position as shown in FIG. 6.

The pivotable toe plate 14 has been pivoted further about the horizontal toe-plate pivot axis 14A toward the projected use position as shown in FIG. 8. The pivotable toe plate 14 has been pivoted far enough about the horizontal toe-plate pivot axis 14A as shown in FIG. 9 to cause the inclined pin-mover ramp 423 of latch manager 40 to engage the exposed dome-shaped tip 31T of toe-plate motion-blocker pin 31 of toe-plate retainer latch 30.

The pivotable toe plate 14 and latch manager 40 coupled to toe plate 14 are shown in FIG. 10 just before the pivotable toe plate 14 arrives at the projected use position. The pivoting inclined pin-mover ramp 423 has begun to push toe-plate motion-blocker pin 31 downwardly relative to top plate 24T of hollow rail 24 to compress the underlying pin-mover spring 32 so that the dome-shaped distal tip 31T of motion-blocker spring 32 moves on the underside of latch manager 40 as shown in FIG. 10 until that tip 31T is aligned with a second pin-receiver aperture 422 formed in latch manager 40 as shown, for example, in FIGS. 12 and 13.

The pivotable toe plate 14 has arrived at the projected use position as shown in FIG. 12. The toe-plate motion-blocker pin 31 has been urged by the underlying pin-mover spring 32 to extend, in sequence, through the first pin-receiver aperture 241 formed in the top plate 24T of hollow rail 24 of frame 20 of rolling base 18 and then through the second pin-receiver aperture 422 formed in latch manager 40 to block pivoting motion of the pivotable toe plate 14 about the horizontal toe-plate pivot axis 14A relative to frame 20 of rolling base 18 as shown in FIG. 12 so that the pivotable toe plate 14 is retained temporarily in the projected use position.

To release latch manager 40 from mating engagement with toe-plate retainer latch 30, a caregiver need only push downwardly on the spring-loaded toe-plate motion-blocker pin 31 and grip pin-retainer plate 42 of latch manger 40 and lift upwardly to flex a portion of latch manager 40 to separate pin-retainer plate 42 from top plate 24T of hollow rail 24 of frame 20 of rolling base 18. In some embodiments, flexure of latch manager 40 is not required. This will cause toe-plate motion-blocker pin 31 to exit the second pin-receiver aperture 241 while remaining in the first pin-receiver operative 241 and thereby free toe plate 14 and latch manger 40 to be pivoted about the horizontal toe-plate pivot axis 14A as toe plate 14 is pivoted away from the projected use position toward the upright storage position.

The invention claimed is:

1. A hand truck comprising
a wheeled cart including a rolling base having a frame and two base wheels coupled to the frame and a base pusher coupled to the rolling base,
a toe plate mounted on a lower end of the frame of the rolling base near the base wheels for pivotable movement about a horizontal toe-plate pivot axis from an upright storage position arranged to extend along the frame in a direction toward the base pusher to a projected use position arranged to extend outwardly at about a right angle to the frame, and
releasable toe-plate lock means for temporarily retaining the toe plate in the projected use position when the toe plate arrives at the projected use position following pivotable movement of the toe plate about the horizontal toe-plate pivot axis away from the upright storage position and toward the projected use position, wherein the releasable toe-plate lock means includes a toe-plate retainer latch coupled to the frame of the rolling base and arranged to be moved relative to the frame during arrival of the toe plate at the projected use position as the toe plate pivots about the horizontal toe-plate pivot axis and a latch manager coupled to the toe plate to pivot with the toe plate as the toe plate is pivoted about the horizontal toe-plate pivot axis between the upright storage position and the projected use position and arranged to engage and move the toe-plate retainer latch relative to the frame during arrival of the toe plate at the projected use position to cause the latch manager to mate with the latch to retain the toe plate temporarily in the projected use position, wherein the toe-plate retainer latch includes a toe-plate motion-blocker pin and a pin-mover spring coupled to the toe-plate motion-blocker pin, the frame of the rolling base comprises a hollow rail that includes a top plate and an interior region under the top plate, the top plate is formed to include a first pin-receiver aperture that is sized to receive the toe-plate motion-blocker pin, and the pin-mover spring is arranged to lie in the interior region formed in the hollow rail and yieldably urge the toe-plate motion-blocker pin in an upward direction through the first pin-receiver aperture in the top plate of the hollow rail to mate with the latch manager when the toe plate pivots about the horizontal toe-plate pivot axis and arrives at the projected use position to block further pivotable movement of the toe plate about the horizontal toe-plate pivot axis retain the toe plate in the projected use position.

2. The hand truck of claim 1, wherein the latch manager is formed to include a second pin-receiver aperture that is aligned with the first pin-receiver aperture formed in the top plate of the hollow rail when the toe plate arrives at the projected use position and the pin-mover spring urges the toe-plate motion-blocker pin to extend upwardly through the first and second pin-receiver apertures to block piovtable movement of the latch manger relative to the latch about the horizontal toe-plate pivot axis.

3. The hand truck of claim 1, wherein the latch manager includes a mount plate cantilevered to the toe plate and a pin-retainer plate formed to include the second pin-receiver aperture and cantilevered to a free end of the mount plate and made of an elastic material and wherein the pin-retainer plate is configured to flex and move relative to the mount plate in response to application of an upward external lifting force to a free end of the pin-retainer plate to cause the toe-plate motion-blocker pin to exit the second pin-receiver aperture and thereby free the toe plate and the latch manager to be pivoted about the horizontal toe-plate pivot axis as the toe plate is pivoted away from the projected use position toward the upright storage position.

4. The hand truck of claim 1, wherein the toe plate includes a carrier and a bracket coupled to a rear edge of the carrier and arranged to extend upwardly away from the carrier and the latch manager includes a mount plate cantilevered to the bracket and arranged to extend upwardly away from the carrier and a pin-receiver plate coupled to a free end of the mount plate to lie in spaced-apart relation to the bracket of the toe plate and formed to include the second pin-receiver aperture.

5. The hand truck of claim 1, wherein the toe-plate motion-blocker pin includes a base that extends through the first pin-receiver aperture formed in the top plate of the hollow rail and a dome-shaped distal tip coupled to a free end of the base and the dome-shaped distal tip of the toe-plate motion-blocker pin is arranged to be exposed above the top plate and the interior region of the hollow rail to be engaged and moved downwardly in the first pin-receiver aperture formed in the top plate by engagement with the latch manager of the releasable toe-plate lock during pivotable movement of the toe plate and the latch manager about the horizontal toe-plate pivot axis away from the upright storage position and toward the projected use position to allow the toe plate to pivot to assume the projected use position and allow upward movement of the toe-plate motion blocker pin relative to the top plate of the hollow rail in response to a lifting force applied by the pin-mover spring upon arrival of the toe plate at the projected use position to mate with the latch manager to retain the toe plate in the projected use position.

6. The hand truck of claim 5, wherein the hollow rail further includes a bottom plate arranged to lie in spaced-apart relation to the top plate to locate the interior region therebetween and the pin-mover spring is positioned to lie in the interior region between the top and bottom plates and to act against the bottom plate to yieldably urge the toe-plate motion-blocker pin upwardly in the first pin-receiver aperture, and the pin-mover spring is compliant to allow downward movement of the toe-plate motion-blocker pin toward the bottom plate of the hollow rail during application of a downward force to the dome-shaped distal tip of the toe-plate motion-blocker pin by the latch manager during pivotable movement of the toe plate about the horizontal toe-plate pivot axis from the upright storage position to the projected use position.

7. The hand truck of claim 5, wherein the latch manager is formed to include a second pin-receiver aperture and the base of the toe-plate motion-blocker pin is arranged to extend first through the first pin-receiver aperture formed in the top plate of the hollow rail and then through the second pin-receiver aperture formed in the latch manager when the toe plate occupies the projected use position to retain the toe plate in the projected use position.

8. The hand truck of claim 5, wherein the latch manager includes a mount plate coupled to the toe plate to pivot therewith about the horizontal toe-plate pivot axis and a pin-receiver plate formed to include a second pin-receiver aperture and coupled to a free end of the mount plate to extend away from the mount plate and the toe plate and the base of the toe-plate motion-blocker pin is arranged to extend in sequence through the first and second pin-receivers to retain the toe plate in the projected use position following pivoting movement of the toe plate about the horizontal toe-plate pivot axis to assume the projected use position.

9. The hand truck of claim 8, wherein the hollow rail further includes a bottom plate arranged to lie in spaced-apart relation to the top plate to locate the interior region therebetween and the pin-mover spring includes a pin platform coupled to the base of the toe-plate motion-blocker pin and a platform mover having an upper end coupled to the pin platform and a lower end arranged to engage the bottom plate.

10. The hand truck of claim 8, wherein the pin-receiver plate includes a ramp support cantilevered to a free end of the mount plate and an inclined pin-mover ramp cantilevered to a free end of the ramp support and the inclined pin-mover ramp is configured to provide means for engaging the dome-shaped distal tip of the toe-plate motion-blocker pin during pivoting movement of the toe plate about the horizontal toe-plate pivot axis from the upright storage position to the projected use position to cause the toe-plate motion-blocker pin to move downwardly relative to the top plate of the hollow rail and compress the pin-mover spring so that the dome-shaped distal tip of the toe-plate motion-blocker pin rides along a pin-guiding surface of the ramp support and the inclined pin-mover ramp of the pin-receiver plate until the dome-shaped distal tip of the toe-plate motion-blocker pin is aligned with the second pin-receiver aperture formed in the pin-receiver plate to allow the pin-mover spring in a compressed state to expand and move the toe-plate motion-blocker pin upwardly into the second pin-receiver aperture formed in the pin-receiver plate of the latch manager when the toe plate arrives at the projected use position and thereafter block pivoting movement of the toe plate relative to the frame of the rolling base.

11. The hand truck of claim 10, wherein the hollow rail further includes a bottom plate arranged to lie in spaced apart relation to the top plate to locate the interior region therebetween, the pin-mover spring includes a horizontally extending pin platform lying in confronting relation to an underside of the top plate and an angled platform mover having an upper end coupled to the horizontally extending pin platform and a lower end engaged to the bottom plate, and the base of the toe-plate motion-blocker pin is coupled to an upwardly facing surface of the horizontally extending pin platform to orient the dome-shaped distal tip of the toe-plate motion-blocker pin to face upwardly away from the horizontally extending pin platform and the angled platform mover.

12. The hand truck of claim 5, wherein the latch manager is formed to include a second pin-receiver aperture that is aligned with the first pin-receiver aperture when the toe plate is pivoted about the horizontal toe-plate pivot axis to assume the projected use position to allow the toe-plate motion-blocker pin to extend through each of the first and second pin-receiver apertures to block further pivotable movement of the toe plate about the horizontal toe-plate pivot axis.

13. The hand truck of claim 12, wherein the hollow rail further includes a bottom plate arranged to lie in spaced-apart relation to the top plate to locate the interior region therebetween, the pin-mover spring includes a horizontally extending pin platform lying in confronting relation to an underside of the top plate and an angled platform mover having an upper end coupled to the horizontally extending pin platform and a lower end engaged to the bottom plate, and the base of the toe-plate motion-blocker pin is coupled to an upwardly facing surface of the horizontally extending pin platform to orient the dome-shaped distal tip of the toe-plate motion-blocker pin to face upwardly away from the horizontally extending pin platform and the angled platform mover.

14. The hand truck of claim 12, wherein the latch manager includes a pin-receiver plate formed to include the second pin-receiver aperture and a mount plate having one end coupled to the toe plate and another end coupled to the pin-receiver plate to interconnect the mount and toe plates and the pin-receiver plate includes a ramp support coupled to a free end of the mount plate and arranged to lie at about a right angle to the mount plate and an inclined pin-mover ramp cantilevered to a free end of the ramp support to define an obtuse dihedral angle therebetween and define means for engaging a free end of the toe-plate motion-blocker pin during pivoting motion of the toe plate about the horizontal toe-plate pivot axis from the upright storage position to the projected use position to cause the toe-plate motion-blocker pin to move downwardly in the first pin-receiver aperture until the first and second pin-receiver apertures are aligned upon arrival of the pivoting toe plate at the projected use position to free the toe-plate motion-blocker pin to move upwardly in the first pin-receiver aperture to extend into the second pin-receiver aperture to block movement of the latch manager relative to the toe-plate retainer latch.

15. The hand truck of claim 1, wherein the latch manager includes a mount plate cantilevered to the toe plate and a pin-retainer plate formed to include the second pin-receiver aperture and arranged to extend in generally perpendicular relation to the mount plate to allow the toe-plate motion-blocker pin to extend into the second pin-receiver aperture to block relative movement of the latch manager and the toe-plate retainer latch upon arrival of the toe plate at the projected use position and to allow a caregiver to apply a downward pushing force to an exposed portion of the toe-plate motion-blocker pin to cause the toe-plate motion-blocker pin to exit the second pin-receiver aperture formed in the pin-retainer plate to free the latch manager and the toe plate to be moved relative to the toe-plate retainer latch to allow pivoting movement of the toe plate about the horizontal pivoting toe-plate pivot axis from the projected use position to the upright storage position.

16. A hand truck comprising
a wheeled cart including a rolling base having a frame and at least one base wheel coupled to the frame and a base pusher coupled to the rolling base,
a toe plate mounted on a lower end of the frame of the rolling base near the at least one base wheel for pivotable movement about a horizontal toe-plate pivot axis from an upright storage position arranged to extend along the frame in a direction toward the base pusher to a projected use position arranged to extend outwardly at about a right angle to the frame, and
a releasable toe-plate lock configured to temporarily retain the toe plate in the projected use position when the toe plate arrives at the projected use position following pivotable movement of the toe plate about the horizontal toe-plate pivot axis away from the upright storage position and toward the projected use position, wherein the releasable toe-plate lock includes a toe-plate retainer latch coupled to the frame of the rolling base and arranged to be moved relative to the frame during arrival of the toe plate at the projected use position as the toe plate pivots about the horizontal toe-plate pivot axis and a latch manager coupled to the toe plate to pivot with the toe plate as the toe plate is pivoted about the horizontal toe-plate pivot axis between the upright storage position and the projected use position and arranged to engage and move the toe-plate retainer latch relative to the frame during arrival of the toe plate at the projected use position to cause the latch manager to mate with the latch to retain the toe plate temporarily in the projected use position,
wherein the toe-plate retainer latch includes a toe-plate motion-blocker pin and a pin-mover spring coupled to the toe-plate motion-blocker pin, the frame of the rolling base comprises a hollow rail that includes a top plate and an interior region under the top plate, the top plate is formed to include a first pin-receiver aperture that is sized to receive the toe-plate motion-blocker pin, and the pin-mover spring is arranged to lie in the interior region formed in the hollow rail and yieldably urge the toe-plate motion-blocker pin in an upward direction through the first pin-receiver aperture in the top plate of the hollow rail to mate with the latch manager when the toe plate pivots about the horizontal toe-plate pivot axis and arrives at the projected use position to block further pivotable movement of the toe plate about the horizontal toe-plate pivot axis retain the toe plate in the projected use position.

17. The hand truck of claim 16, wherein the latch manager is formed to include a second pin-receiver aperture that is aligned with the first pin-receiver aperture formed in the top plate of the hollow rail when the toe plate arrives at the projected use position and the pin-mover spring urges the toe-plate motion-blocker pin to extend upwardly through the first and second pin-receiver apertures to block piovtable movement of the latch manger relative to the latch about the horizontal toe-plate pivot axis.

18. The hand truck of claim 16, wherein the latch manager includes a mount plate cantilevered to the toe plate and a pin-retainer plate formed to include the second pin-receiver aperture and cantilevered to a free end of the mount plate and made of an elastic material and wherein the pin-retainer plate is configured to flex and move relative to the mount plate in response to application of an upward external lifting force to a free end of the pin-retainer plate to cause the toe-plate motion-blocker pin to exit the second pin-receiver aperture and thereby free the toe plate and the latch manager to be pivoted about the horizontal toe-plate pivot axis as the toe plate is pivoted away from the projected use position toward the upright storage position.

19. The hand truck of claim 16, wherein the toe plate includes a carrier and a bracket coupled to a rear edge of the carrier and arranged to extend upwardly away from the carrier and the latch manager includes a mount plate cantilevered to the bracket and arranged to extend upwardly away from the carrier and a pin-receiver plate coupled to a free end of the mount plate to lie in spaced-apart relation to the bracket of the toe plate and formed to include the second pin-receiver aperture.

20. The hand truck of claim 16, wherein the toe-plate motion-blocker pin includes a base that extends through the first pin-receiver aperture formed in the top plate of the hollow rail and a dome-shaped distal tip coupled to a free end of the base and the dome-shaped distal tip of the toe-plate motion-blocker pin is arranged to be exposed above the top plate and the interior region of the hollow rail to be engaged and moved downwardly in the first pin-receiver aperture formed in the top plate by engagement with the latch manager of the releasable toe-plate lock during pivotable movement of the toe plate and the latch manager about the horizontal toe-plate pivot axis away from the upright storage position and toward the projected use position to allow the toe plate to pivot to assume the projected use position and allow upward movement of the toe-plate motion blocker pin relative to the top plate of the hollow rail in response to a lifting force applied by the pin-mover spring upon arrival of the toe plate at the projected use position to mate with the latch manager to retain the toe plate in the projected use position.

\* \* \* \* \*